(12) United States Patent
Swinderman

(10) Patent No.: US 6,457,575 B2
(45) Date of Patent: Oct. 1, 2002

(54) SELF-LOCKING PIN MOUNTING ARRANGEMENT FOR CONVEYOR BELT CLEANER SCRAPER BLADES

(75) Inventor: R. Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/882,924

(22) Filed: Jun. 15, 2001

Related U.S. Application Data

(60) Provisional application No. 60/214,131, filed on Jun. 26, 2000.

(51) Int. Cl.$^7$ ............................................... B65G 45/16
(52) U.S. Cl. ....................................... 198/499; 198/497
(58) Field of Search ................................ 198/497, 499

(56) References Cited

U.S. PATENT DOCUMENTS

| | | | |
|---|---|---|---|
| 4,643,293 A | 2/1987 | Swinderman | 198/497 |
| 4,953,689 A | 9/1990 | Peterson et al. | 198/497 |
| 5,011,002 A * | 4/1991 | Gibbs | 198/499 X |
| 5,016,746 A | 5/1991 | Gibbs | 198/499 |
| 5,887,702 A | 3/1999 | Mott | 198/499 |

FOREIGN PATENT DOCUMENTS

| | | |
|---|---|---|
| EP | 0262272 | 4/1988 |
| EP | 0573688 | 12/1993 |
| EP | 0893376 | 1/1999 |
| GB | 2221440 | 2/1990 |
| WO | WO 00/63097 | 10/2000 |

* cited by examiner

Primary Examiner—James R. Bidwell
(74) Attorney, Agent, or Firm—Lee, Mann, Smith, McWilliams, Sweeney & Ohlson

(57) ABSTRACT

A mounting arrangement for removably mounting a conveyor belt cleaner scraping member to a support member. The mounting arrangement includes first and second mounting members adapted to be attached to the support member. Each mounting member includes one or more apertures. A base member is adapted to be attached to the scraping member. The base member includes one or more bores adapted to be aligned with a respective aperture in each mounting member. The bore includes inwardly projecting first and second annular ribs. A mounting pin having a shank is adapted to be inserted into the apertures of the first and second mounting members and into the bore of the base member to thereby connect the base member to the mounting members. The shank of the pin includes a first annular groove adapted to receive and interlock with the first rib of the base member and a second annular groove adapted to receive and interlock with the second annular rib of the base member. The interlocking of the ribs of the base member with the grooves of the mounting pin resists removal of the pin from the bore of the base member while allowing removal of the pin from the bore upon application of sufficient force to the pin.

27 Claims, 3 Drawing Sheets

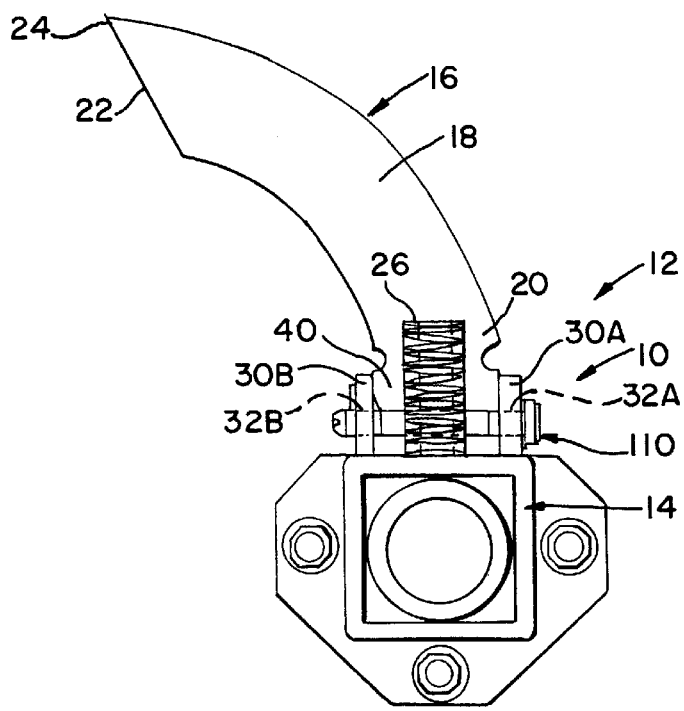
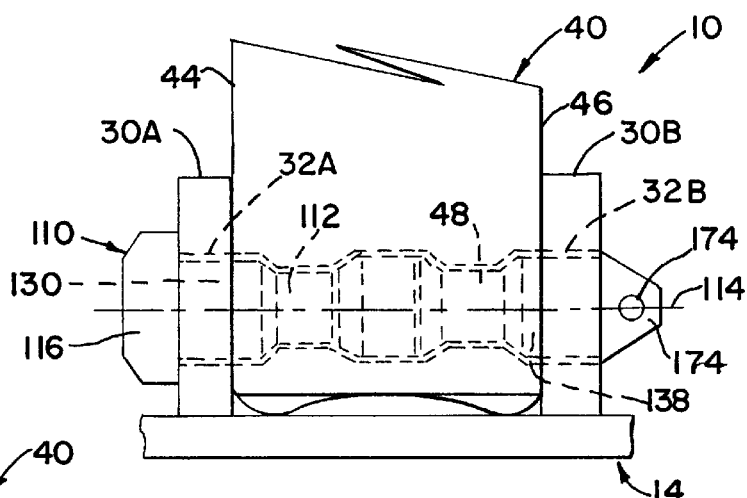
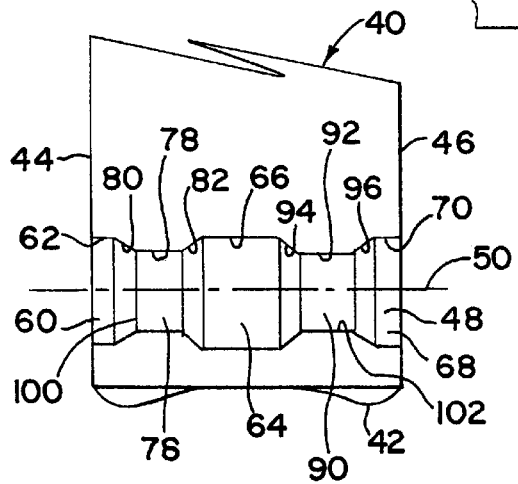

SELF-LOCKING PIN MOUNTING ARRANGEMENT FOR CONVEYOR BELT CLEANER SCRAPER BLADES

RELATED APPLICATIONS

This application claims the benefit of U.S. Provisional Application No. 60/214,131, filed Jun. 26, 2000.

BACKGROUND OF THE INVENTION

The present invention is directed to a self-locking pin mounting arrangement for removably mounting conveyor belt cleaner scraper blades to a cross-shaft of a conveyor belt cleaner, and in particular to a mounting arrangement which includes a pin having a shank with one or more annular grooves which is adapted to be inserted into a bore in a base member of a scraper blade.

Threaded fasteners, such as threaded bolts and threaded nuts, are often used to mount rubber or elastomeric conveyor belt scraper blades to the cross-shaft of a conveyor belt cleaner. Conveyor belt cleaners are used in hostile environments wherein the fasteners become corroded and are often impossible to be removed without the use of a cutting torch. Even when threaded fasteners can be removed without the use of a cutting torch, it is often a difficult and time consuming process due to the conditions found in and around conveyors.

Other types of scraper blade mounting arrangements which do not utilize threaded fasteners have been used to removably mount scraper blades to cross-shafts. One such mounting arrangement is shown in U.S. Pat. No. 4,953,689 of Martin Engineering. This mounting arrangement utilizes a track in which the scraper blade is slidably inserted. Over long periods of time fines from the conveyed material can build up in the track and make removal of scraper blades difficult. In addition, even in track mounting arrangements some type of fastener is needed to prevent horizontal sliding movement of the scraper blades. Other mounting arrangements, known as cartridge systems, use a single cylindrical pin at each end of the scraper blade to prevent removal of the blades. The cartridge type of mounting arrangement is useful in connection with conveyor belt cleaners that are used with conveyor belts having a small to medium width, and for conveyor belt cleaners that include a one-piece scraper blade.

SUMMARY OF THE INVENTION

A mounting arrangement for removably connecting a scraping member to a support member. The mounting arrangement includes a first mounting member and a second mounting member adapted to be attached to the support member. The first mounting member includes one or more first apertures and the second mounting member includes one or more second apertures. The mounting arrangement includes a base member adapted to be attached to the scraping member. The base member includes a bore including an inwardly projecting first annular rib and a spaced apart inwardly projecting second annular rib. Each annular rib includes a generally cylindrical side wall located between a first generally conical side wall and a second generally conical side wall. The bore also includes a generally cylindrical side wall located between the first and second ribs that has a diameter that is larger than the diameter of the cylindrical side walls of the first and second ribs.

The mounting arrangement includes a mounting pin having a shank that is adapted to be inserted into the first and second apertures of the first and second mounting members and the bore of the base member. The mounting pin includes a first annular groove and a spaced apart second annular groove. Each annular groove includes a generally cylindrical surface located between first and second generally conical surfaces. The first annular groove of the shank is adapted to receive and interlock with the first annular rib of the base member and the second annular groove of the shank is adapted to receive and interlock with the second annular rib of the base member. The first rib of the base member interlocks with the first groove of the pin and the second rib of the base member interlocks with the second groove of the pin such that the ribs resist removal of the pin from the bore of the base member while allowing removal of the pin from the bore of the base member upon application of sufficient force to the pin.

BRIEF DESCRIPTION OF THE DRAWING FIGURES

FIG. 1 is a side elevational view of a conveyor belt cleaner including the pin mounting arrangement of the present invention.

FIG. 2 is a side elevational view, which is partially broken away, of the pin mounting arrangement of the present invention.

FIG. 3 is a cross-sectional view of a portion the base member of the pin mounting arrangement.

DETAILED DESCRIPTION OF THE PREFERRED EMBODIMENTS

Figure 4:
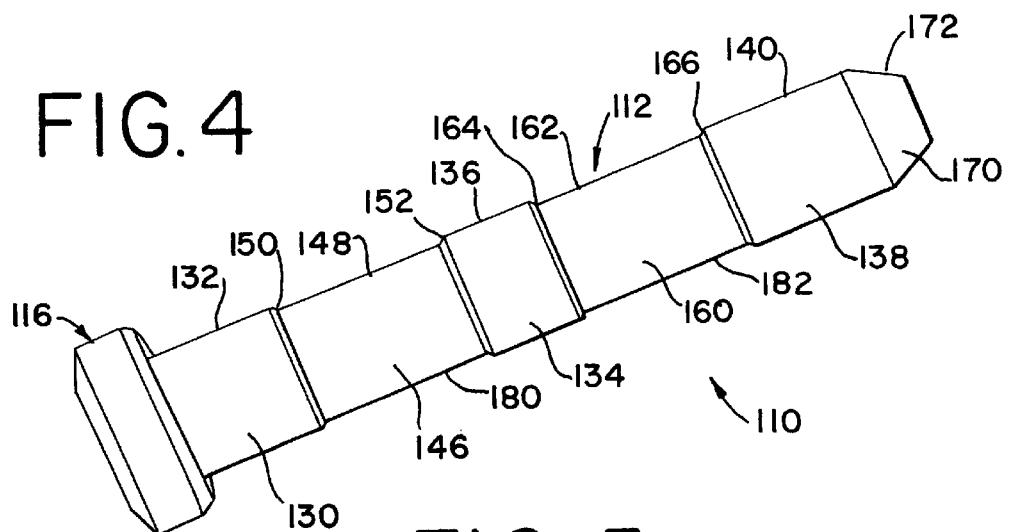
FIG. 4 is a perspective view of the self-locking pin of the pin mounting arrangement.

A mounting arrangement 10 of the present invention is shown in FIG. 1 as part of a conveyor belt cleaner 12. The conveyor belt cleaner 12 includes an elongate support member such as a cross-shaft 14 which may be rotatable about its central axis or otherwise movable for tensioning the blades against the belt. The cross-shaft 14, as shown in FIG. 1, is formed from a generally square tube, but can be formed from a rectangular tube, a circular tube, beams, channels and the like. The conveyor belt cleaner 12 also includes one or more scraper blades 16 each having a scraping member 18 that extends from a first end 20 to a second end 22. The scraping member 18 includes a scraping edge 24 that is adapted to be biased into scraping engagement with a moving conveyor belt. As shown in FIG. 1, the scraper blade 16 includes one or more resilient spring members 26 positioned within the first end 20, as will be more fully described, which are adapted to resiliently bias the scraping member 18 into scraping engagement with the conveyor belt.

The mounting arrangement 10 includes mounting members 30A and B. Each mounting member 30A–B comprises an elongate generally rectangular bar or plate. However, any of a number of configurations of mounting members could be utilized such as pockets or upstanding ears or lugs. Each mounting member 30A–B is attached at its lower end to the cross-shaft 14 by welding or the like. The mounting members 30A–B extend generally vertically upwardly from the cross-shaft 14 and are spaced apart and generally parallel to one another. The mounting member 30A includes one or more generally circular apertures 32A and the mounting member 30B includes one or more generally circular apertures 32B. The apertures 32A–B are spaced apart from one another along the length of the respective mounting members 30A–B. The diameter of each aperture 32A is equal to the diameter of each aperture 32B. Each aperture 32B includes a central axis that is aligned coaxially with the central axis of an opposing aperture 32A.

The mounting arrangement 10 also includes a base member 40 that is attached to the first end 20 of the scraping member 18. If desired, an arm member can be used to attach the scraping member 18 to the base member 40 as illustrated in U.S. Pat. No. 4,643,293 of Martin Engineering. The base member 40 may be integrally formed with and connected to the scraping member 18 such that it forms part of the scraper blade 16. The base member 40 and scraper blade 16 are preferably made from a resilient elastomeric material such as rubber or urethane. As shown in FIG. 1, the spring members 26 extend into the base member 40. As best shown in FIG. 3, the base member 40 includes a bottom end 42 that is adapted to engage the cross-shaft 14, a generally planar first side surface 44 that extends generally vertically upward from the bottom end 42, and a generally planar second side surface 46 that extends generally vertically upward from the bottom end 42. The first and second side surfaces 44 and 46 are spaced apart and generally parallel to one another. The base member 40 includes one or more bores 48 which extend from the first side surface 44 to the second side surface 46. Each bore 48 includes a generally linear central axis 50. The central axis 50 of each bore 48 is adapted to be aligned coaxially with the central axes of a pair of opposing apertures 32A and 32B in the mounting members 30A–B as shown in FIG. 2.

Each bore 48 includes a first generally cylindrical chamber 60 formed by a generally cylindrical sidewall 62. The first cylindrical sidewall 62 extends inwardly into the base member 40 from the first side surface 44 and is located generally concentrically about the axis 50. The bore 48 includes a second generally cylindrical chamber 64 formed by a second generally cylindrical sidewall 66 which extends generally concentrically about the axis 50. The second cylindrical chamber 64 and the second cylindrical sidewall 66 are generally located midway between the first side surface 44 and the second side surface 46 of the base member 40. The bore 48 includes a third generally cylindrical chamber 68 that is formed by a third generally cylindrical sidewall 70 which extends generally concentrically about the axis 50. The third cylindrical chamber 68 and third cylindrical sidewall 70 extend inwardly into the base member 40 from the second side surface 46. The first, second and third cylindrical chambers 60, 64 and 68 and the first, second and third cylindrical sidewalls 62, 66 and 70 each preferably have the same diameter.

The bore 48 includes a fourth generally cylindrical chamber 76 formed by a fourth generally cylindrical sidewall 78 which extends generally concentrically about the axis 50. The fourth cylindrical chamber 76 and the fourth cylindrical sidewall 78 are located along the axis 50 generally midway between the first cylindrical chamber 60 and the second cylindrical chamber 64. A generally conical transitional wall 80 extends from the first cylindrical sidewall 62 inwardly to the fourth cylindrical sidewall 78. A generally conical transitional sidewall 82 extends outwardly from the fourth cylindrical sidewall 78 to the second cylindrical sidewall 66. The transitional sidewalls 80 and 82 extend generally concentrically about the axis 50 and are preferably inclined at an angle of approximately thirty degrees to the axis 50.

The bore 48 also includes a fifth generally cylindrical chamber 90 formed by a fifth generally cylindrical sidewall 92 which extends concentrically about the axis 50. The fifth cylindrical chamber 90 and the fifth cylindrical sidewall 92 are located approximately midway between the second cylindrical sidewall 66 and the third cylindrical sidewall 70. A generally conical transitional sidewall 94 extends inwardly from the second cylindrical sidewall 66 to the fifth cylindrical sidewall 92. A generally conical transitional sidewall 96 extends outwardly from the fifth cylindrical sidewall 92 to the third cylindrical sidewall 70. The transitional sidewalls 94 and 96 extend generally concentrically about the axis 50 and are preferably inclined at an angle of approximately thirty degrees to the axis 50. The diameter of the fifth cylindrical sidewall 92 is equal to the diameter of the fourth cylindrical sidewall 78. The diameter of the fourth cylindrical sidewall 78 and the fifth cylindrical sidewall 92 is shorter than the diameter of the cylindrical sidewalls 62, 66 and 70 by a distance such as approximately one-sixteenth of an inch. The bore 48 includes a first inwardly projecting annular rib 100 formed by the cylindrical sidewall 78 and the transitional walls 80 and 82. The bore 48 includes a second inwardly projecting annular rib 102 formed by the cylindrical sidewall 92 and the transitional walls 94 and 96.

Figure 5:
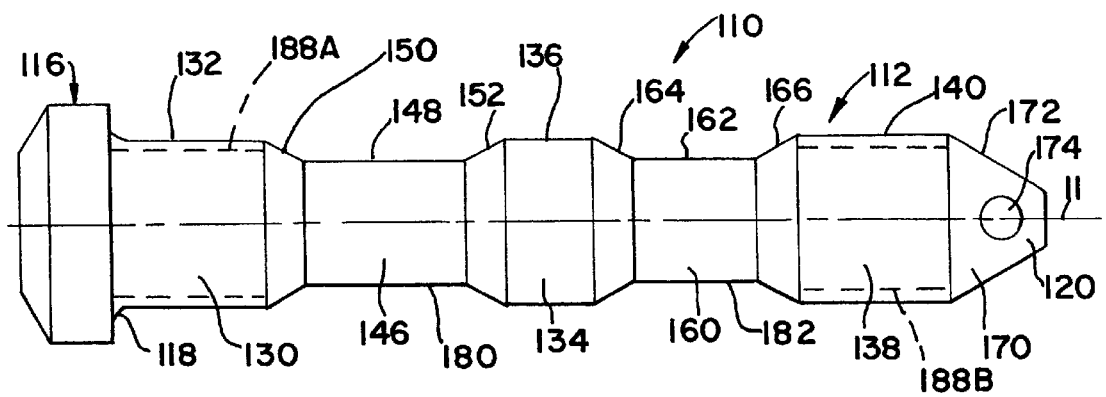
FIG. 5 is a side elevational view of the self-locking pin.

The mounting arrangement 10 also includes a self-locking mounting pin 110 as best shown in FIGS. 4 and 5. The pin 110 includes a shank 112 having a generally linear central axis 114 and a head 116. The shank 112 extends along the axis 114 between a first end 118 and a second end 120. The head 116 is attached to the first end 118 of the shank 112. The shank 112 includes a first generally cylindrical portion 130 having a first generally cylindrical surface 132 at the first end 118 which extend generally concentrically about the axis 114. The head 116 is attached to the first cylindrical portion 130. The shank 112 also includes a second generally cylindrical portion 134 having a second generally cylindrical surface 136 that are located concentrically about the axis 114. The shank 112 also includes a third generally cylindrical portion 138 having a third generally cylindrical surface 140 which are located generally concentrically about the axis 114. The second cylindrical portion 134 is located approximately midway between, and is spaced apart from, the first cylindrical portion 130 and the third cylindrical portion 138. The cylindrical portions 130, 134 and 138 and the cylindrical surfaces 132, 136 and 140 each have a uniform diameter approximately equal to or slightly smaller than the diameter of the cylindrical sidewalls 62, 66 and 70 of the bore 48 of the base member 40.

The shank 112 also includes a fourth generally cylindrical portion 146 having a fourth generally cylindrical surface 148 located generally concentrically about the axis 114 and located approximately midway between and spaced apart from the first cylindrical portion 130 and the second cylindrical portion 134. A generally conical transitional surface 150 extends inwardly from the first cylindrical surface 132 to the fourth cylindrical surface 148. A generally conical transition surface 152 extends outwardly from the fourth cylindrical surface 148 to the second cylindrical surface 136.

The shank 112 also includes a fifth generally cylindrical portion 160 having a fifth generally cylindrical surface 162 which are located generally concentrically about the axis 114 and which are located approximately midway between and spaced apart from the second cylindrical portion 134 and the third cylindrical portion 138. A generally conical transitional surface 164 extends inwardly from the second cylindrical surface 136 to the fifth cylindrical surface 162. A generally conical transitional surface 166 extends outwardly from the fifth cylindrical surface 162 to the third cylindrical surface 140. The transitional surfaces 150, 152, 164 and 166 are preferably inclined at an angle of approximately thirty degrees to the axis 114. The first cylindrical surface 148 and the fifth cylindrical surface 162 have the same diameter which is smaller than the diameter of the cylindrical surfaces 132, 136 and 140 by a distance such as approximately one-sixteenth of an inch.

The shank 112 includes a truncated conical tip 170 having a conical surface 172. A generally cylindrical bore 174 is illustrated which extends through the tip 170 generally perpendicular to the axis 114. As best shown in FIGS. 4 and 5, the shank 112 includes a first annular groove 180 that extends concentrically about the axis 114 and that is formed between the first cylindrical portion 130 and the second cylindrical portion 134 by the fourth cylindrical surface 148 and the transitional surfaces 150 and 152. The shank 112 also includes a second annular groove 182 which extends generally concentrically about the axis 114 and that is formed between the second cylindrical portion 134 and the third cylindrical portion 138 by the fifth cylindrical surface 162 and the transitional surfaces 164 and 166. The first annular groove 180 is adapted to receive and interlock with the first annular rib 100 of the bore 48 in the base member 40 and the second annular groove 182 is adapted to receive and interlock with the second annular rib 102 of the bore 48 in base member 40. The apertures 32A–B in the mounting members 30A–B are preferably slightly larger in diameter than the diameter of the cylindrical surfaces 132, 136 and 140 of the pin 110. If desired the cylindrical portions and the conical portions of the pin 110 and the bore 48 of the base member 40 may be formed in a generally rectangular or other polygonal cross-sectional shape.

In operation, the base member 40 is placed between the mounting members 30A and B with the bottom end 42 located adjacent to the cross-shaft 14. Each bore 48 in the base member 40 is aligned coaxially with a respective pair of opposing apertures 32A and B in the mounting members 30A and B. The tip 170 of the pin 110 is inserted into the aperture 32A of the mounting member 30A and into the bore 48 of the base member 40. The pin 110 is then driven along its axis 114, either manually or by a hammer or the like, further into and through the bore 48 and through the aperture 32B in the mounting member 30B until the head 116 engages the mounting member 30A. As the third cylindrical portion 138 of the pin 110 passes through the ribs 100 and 102 of the bore 48, and as the second cylindrical portion 134 of the pin 110 passes through the rib 100 of the bore 48, the diameter of the ribs 100 and 102 is expanded to allow passage of the cylindrical portions 134 and 138 after which the ribs 100 and 102 will resiliently retract to their original diameter to the interlock in the grooves 180 and 182. The pin 110 may alternatively be inserted through the mounting member 30B, the bore 48, and then the mounting member 30A.

When the pin 110 is fully inserted into the bore 48 of the base member 40 from the left-hand side, such as shown in FIG. 2, the head 116 engages the mounting member 30A. The first cylindrical portion 130 of the shank 112 substantially fills the aperture 32A in the mounting member 30A and the first cylindrical chamber 60 of the bore 48. The fourth cylindrical portion 146 of the shank 112 substantially fills the fourth cylindrical chamber 76 of the bore 48. The second cylindrical portion 134 of the shank 112 substantially fills the second cylindrical chamber 64 of the bore 48. The fifth cylindrical portion 160 of the shank 112 substantially fills the fifth cylindrical chamber 90 of the bore 48. The third cylindrical portion 138 of the shank 112 substantially fills the third cylindrical chamber 68 of the bore 48 and the aperture 32B of the mounting member 30B. The tip 170 is located outwardly from the mounting member 30B. The annular ribs 100 and 102 formed in the bore 48 are respectively located within the annular grooves 180 and 182 of the pin 110. The ribs 100 and 102 of the bore 48 interlock with the annular grooves 180 and 182 of the pin 110 to resist longitudinal movement of the pin 110 along the axis 114 and thereby resist unintentional withdrawal of the pin 110 from the bore 48. The pin 110 thereby releasably connects the base member 40 and the scraping member 18 attached thereto to the mounting members 30A and B and thereby to the cross-shaft 14. A plurality of scraper blades 16 can be removably attached to the cross-shaft 14 in this manner.

When a one-sixteenth inch difference is provided between the diameter of the cylindrical portions 146 and 160 of the shank 112 and the diameter of the cylindrical portions 130, 134 and 138 of the shank 112, and when the pin 110 is formed from nylon and the base member 40 is formed from 85A durometer urethane, a force of approximately forty pounds is required to insert or withdraw the pin 10 from the bore 48 of the base member 40. If desired, a hair pin, cotter pin, ring fastener or lanyard can be inserted through the bore 174 in the tip 170 of the shank 112 to prevent the pin 110 from becoming unintentionally disengaged from the base member 40. The pin 110 is selectively removed from the bore 48 of the base member 40 and the mounting members 30A and B by manually grasping and pulling on the head 116, or by use of a drift pin and hammer applied to the tip 170 of the pin 110 to drive the pin 110 out of the bore 48. A plurality of pins 110 can be strung together by inserting a lanyard or the like through the bores 174 of the pins 110 for ease of carrying the pins and to prevent loss of the pins.

As best shown in FIG. 2, the bore 48 is formed to conform to the surface configuration of the shank 112 of the pin 110. The pin 110 is preferably made from a metal material such as steel or stainless steel or from a plastic material. Preferred plastic materials include nylon and urethane. In the event that a pin 110 is lost in a conveyor system, a plastic pin is less likely to cause problems in the process being fed by the conveyor system than a metal pin. As shown in FIG. 2, the large diameter first cylindrical portion 130 of the pin 110 is located at the shear plane between the side surface 44 of the base member 40 and the mounting member 30A. The large diameter third cylindrical portion 138 of the pin 110 is located at the shear plane between the second side surface 46 of the base member 40 and the mounting member 30B. The large diameter portions 130 and 138 of the pin 110 are adapted to resist shear forces generated by the base member 40 due to engagement of the scraper blade 16 with the conveyor belt. When the pin 110 is formed from a plastic material, the first cylindrical portion 130 and the third cylindrical portion 138 may each respectively include a generally cylindrical tubular collar 188A–B that is formed from metal to provide additional shear strength to the pin 110. Each base member 140 preferably includes at least two bores 48 that receive respective pins 110 to prevent the base member 40 and scraper blade 16 attached thereto from rocking about the central axis 114 of a single pin 110. However, a single pin 110 can be used in connection with a cartridge type of mounting arrangement.

Figure 6:
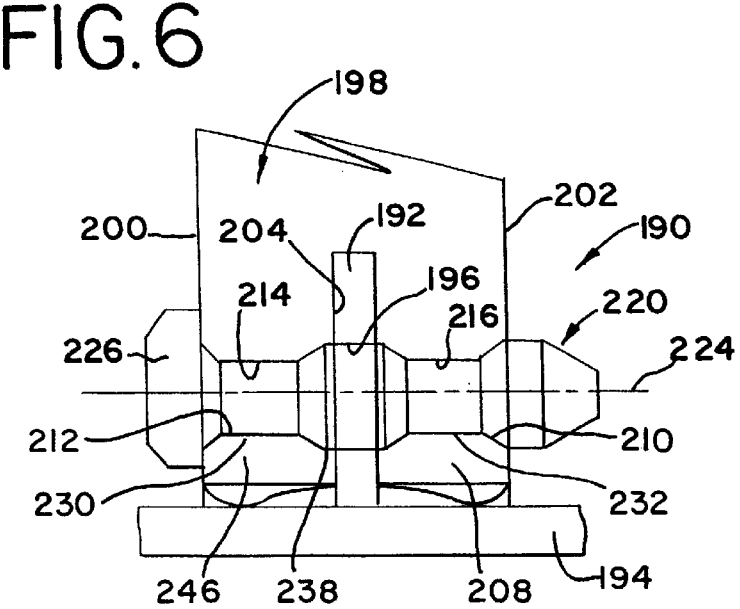
FIG. 6 is a side elevational view of a modified embodiment of the pin mounting arrangement.

A modified embodiment of the mounting arrangement of the present invention is shown in FIG. 6 and is identified with the reference number 190. The mounting arrangement 190 includes a mounting member 192 in the form of a generally vertical plate or lug. The mounting member 192 is attached to and extends vertically upwardly from a support member such as a cross-shaft 194 that may be formed from a tubular member or the like. The mounting member 192 includes one or more generally circular apertures 196.

The mounting arrangement 190 also includes base member 198 that is adapted to be connected to a scraping member. The base member 198 includes a generally planar first side surface 200 and a generally planar second side surface 202 that is spaced apart from and generally parallel to the first side surface 200. The base member 198 also includes an elongate generally rectangular slot 204 located approximately midway between and generally parallel to the first and second side surfaces 200 and 202. The slot 204 is open at the bottom end of the base member 198. The slot 204 is adapted to receive the mounting member 192. The base member 198 includes a first leg 206 and second leg 208 located on opposite sides of the slot 204. The first leg 206 includes one or more first bores 210 which extend from the first side surface 200 to the slot 204. The second leg 208 includes one or more second bores 212 which extend from the second side surface 202 to the slot 204. The bores 210 and 212 are coaxially aligned with one another. The first bores 210 include an inwardly projecting annular rib 214. The second bores 212 include an inwardly projecting annular rib 216. The diameter of the ribs 214 and 216 is smaller than the diameter of the aperture 196 in the mounting member 192.

The mounting arrangement 190 also includes one or more mounting pins 220. Pin 220 includes a shank 222 having a central axis 224 and a head 226. Head 226 is attached to one end of the shank 222. The shank 222 includes a first annular groove 230 and a spaced apart second annular groove 232. The first annular groove 230 is adapted to receive and interlock with the annular rib 214 of the bore 210 and the second annular groove 232 is adapted to receive and interlock with the annular rib 216 of the bore 212. The pin 220 includes a generally cylindrical portion 238 having a generally cylindrical surface which is located between the grooves 230 and 232 and which is adapted to be located within the aperture 196 of the mounting member 192.

As shown in FIG. 6, the pin 220 releasably connects the base member 198 to the mounting member 192. The annular ribs 214 and 216 interlock with the annular grooves 230 and 232 of the pin 220 to inhibit lateral movement of the pin 220 along the central axis 224. However, the pin 220 can be selectively withdrawn from the base member 198 either manually or with use of a hammer and drift pin.

Figure 7:
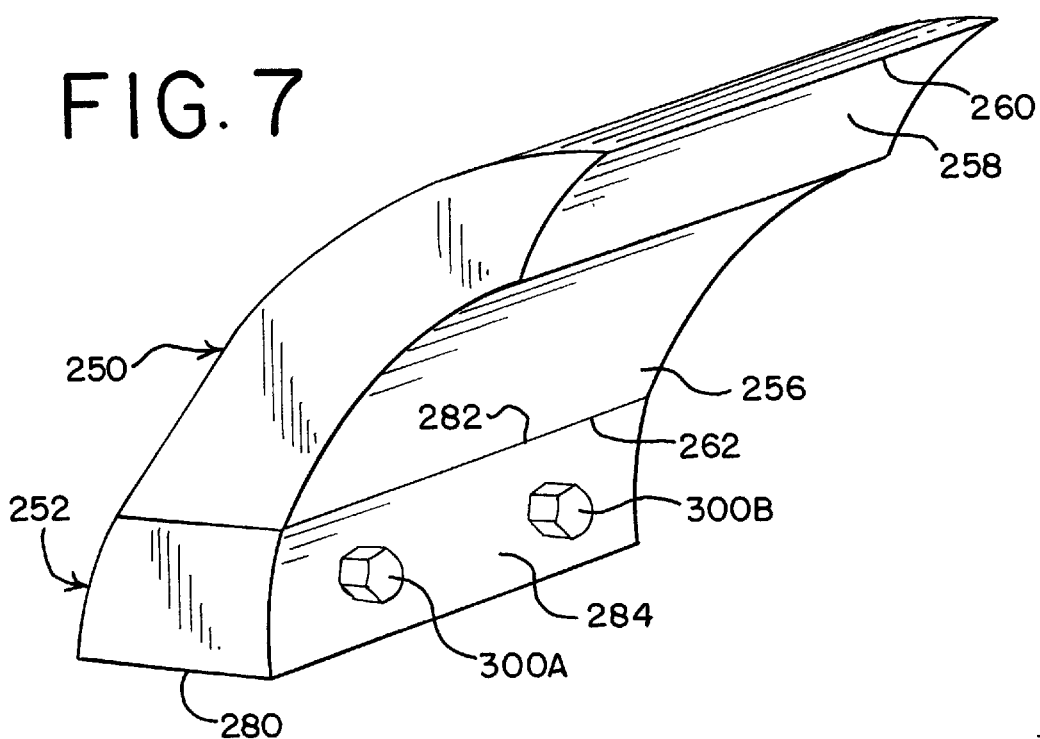
FIG. 7 is a perspective view of modified embodiment of the scraper blade and base member.
Figure 8:
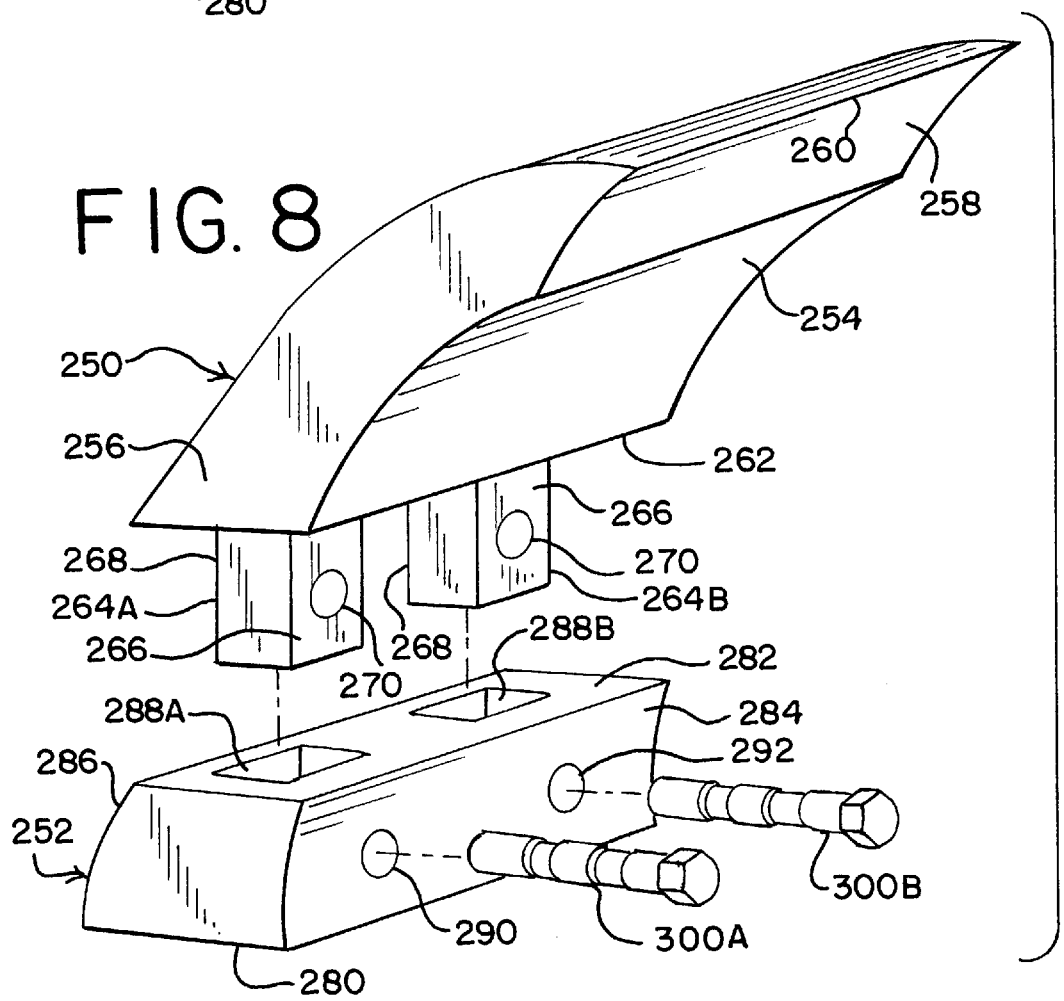
FIG. 8 is an exploded view of the scraper blade and mounting member of FIG. 7.

FIGS. 7 and 8 show a modified embodiment of the scraper blade designated with the reference number 250 and a modified embodiment of the base member designated with the reference number 252. The scraper blade 250 includes a scraping member 254 that extends from a first end 256 to a second end 258. The scraping member 254 includes a scraping edge 260 at the second end 258 and a generally planar bottom surface 262 at the first end 256. The scraper blade 250 also includes a leg 264A and a leg 264B which are spaced apart from one another and which extend downwardly from the bottom surface 262 of the scraping member 254. The legs 264A–B are preferably integrally attached to the scraping member 254. Each leg 264A–B includes a bottom end and a top end that is attached to the bottom surface 262. As shown in FIG. 8, each leg 264A–B is generally square. The legs 264A–B may alternatively be generally cylindrical, rectangular or other polygonal shapes. If desired, the scraper blade 250 may include only one leg or it may include more than two legs. Each leg 264A–B includes a first side surface 266 and a second side surface 268. The side surfaces 266 and 268 are spaced apart and generally parallel to one another. Each leg 264A–B also includes a respective bore 270 that extends through the leg from the first side surface 266 to the second side surface 268. Each bore 270 is configured in the same manner as the bore 48 shown in FIGS. 2 and 3.

The base member 252 includes a bottom end 280 that is adapted to engage the cross shaft 14 and a top end including a generally planar top surface 282 which is adapted to matingly engage the bottom surface 262 of the scraping member 254. The base member 252 includes a first side surface 284 and a second side surface 286 that extend between the bottom end 280 and the top surface 282. The first and second side surfaces 284 and 286 are located on opposite sides of the base member 252. The base member 252 includes a pocket 288A and a pocket 288B. Each pocket 288A–B includes an opening in the top surface 282 of the mounting base 252 and extends downwardly from the top surface 282. If desired each pocket 288A–B may extend completely through the scraping member 254 from the top surface 282 to the bottom end 280. The pocket 288A is configured to matingly and removably receive the leg 264A of the scraper blade 250 and the pocket 288B is configured to matingly and removably receive the leg 264B of the scraper blade 250. The base member 252 includes a bore 290 that extends from the first side surface 284 to the pocket 288A and a bore (not shown) that extends from the second side surface 286 to the pocket 288A that is coaxially aligned with the bore 290. The base member 252 also includes a bore 292 that extends from the first side surface 284 to the pocket 288B and a bore (not shown) that extends from the second side surface 286 to the pocket 288B that is coaxially aligned with the bore 292. The bore 290 is adapted to be coaxially aligned with the bore 270 in the leg 264A when the leg 264A is inserted into the pocket 288A. The bore 292 is similarly adapted to be coaxially aligned with the bore 270 of the leg 264B when the leg 264B is inserted into the pocket 288B. The base member 252 is adapted to be inserted between the mounting members 30A–B of the support member 14 in the same manner as the base member 40, as generally shown in FIG. 2, such that the bores 290 and 292 are each respectively coaxially aligned with apertures 32A–B of the mounting members 30A–B. The mounting members 30A–B are not shown in FIGS. 7 and 8 for purposes of clarity.

A self-locking mounting pin 300A is adapted to be inserted through an aperture 32A of the mounting member 30A, through the bore 290 of the base member 252, through the bore 270 in the leg 264A of the scraper blade 250, through the bore (not shown) in the base member 252 on the opposite side of the pocket 288A from the bore 290, and through an aperture 32B of the mounting member 30B. A self-locking mounting pin 300B is similarly adapted to be inserted through an aperture 32A of the mounting member 30A, through the bore 292 of the base member 252, through the bore 270 in the leg 264B of the scraper blade 250, through the bore (not shown) in the base member 252 on the opposite side of the pocket 288B from the bore 292, and through an aperture 32B of the mounting member 30B. The pins 300A–B are configured in the same manner as the pin 110 as shown in FIGS. 4 and 5. The bores 290 and 292 of the base member 252 are generally cylindrical and are adapted to receive a generally cylindrical portion of the pin 300A or 300B, such as the cylindrical portion 130 or 138 of the pin 110 as shown in FIG. 5. The pins 300A–B removably attach the scraper blade 250 to the base member 252, and removably attach the base member 252 and the scraper blade 250 to the mounting members 30A–B.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A scraper blade for a conveyor belt cleaner including:

a scraping member having a first end and a second end;

a base member attached to said second end of said scraping member, said base member including a first bore extending therethrough and adapted to receive a pin, said first bore having a first rib adapted to engage the pin to resist removal of the pin.

2. The scraper blade of claim 1 wherein said first rib is generally annular and projects inwardly.

3. The scraper blade of claim 1 wherein said first rib includes a generally cylindrical side wall, a first generally conical side wall and a second generally conical side wall, said cylindrical side wall being located between said first and second conical side walls.

4. The scraper blade of claim 1 wherein said first bore includes a second rib.

5. The scraper blade of claim 4 wherein said first bore includes a generally cylindrical side wall located between said first rib and said second rib.

6. The scraper blade of claim 1 wherein said base member includes a first leg and a second leg, said first leg including said first bore and said second leg including a second bore, said second bore including an inwardly projecting second rib.

7. The scraper blade of claim 6 wherein said base member includes a slot located between said first leg and said second leg.

8. A scraper blade for a conveyor belt cleaner including:

a scraping member having a first end and a second end;

a first leg attached to said first end of said scraping member, said first leg including a first bore extending therethrough and adapted to receive a first pin, said first bore having a first rib adapted to engage the first pin to resist removal of the first pin.

9. The scraper blade of claim 8 wherein said first rib is generally annular and projects inwardly.

10. The scraper blade of claim 8 including a second leg attached to said first end of said scraping member, said first leg including a second bore extending therethrough and adapted to receive a second pin, said second bore having a second rib adapted to engage the second pin to resist removal of the second pin.

11. The scraper blade of claim 10 wherein said first bore of said first leg includes a third rib, and said second bore of said second leg includes a fourth rib.

12. The scraper blade of claim 8 including a base member having a first pocket adapted to receive said first leg, said base member including a second bore adapted to be aligned with said first bore of said first leg when said first leg is inserted into said first pocket such that the first pin may be inserted into said first bore and into said second bore to thereby connect said first leg to said base member.

13. The scraper blade of claim 12 including a second leg attached to said first end of said scraping member, said second leg including a third bore extending therethrough and adapted to receive a second pin, said third bore having a second rib adapted to engage the second pin to resist removal of the second pin, and said base member includes a second pocket adapted to receive said second leg, said base member including a fourth bore adapted to be aligned with said third bore of said second leg such that the second pin may be inserted into said third bore and into said fourth bore to thereby connect said second leg to said base member.

14. A mounting arrangement for removably mounting a scraping member to a support member, said mounting arrangement including:

a first mounting member adapted to be attached to the support member, said first mounting member including a first aperture;

a base member adapted to be attached to the scraping member, said base member including a first bore, said first bore including a first rib; and a mounting pin having a first end, a second end and a first groove adapted to receive said first rib of said base member;

whereby when said pin is inserted into said aperture of said first mounting member and into said first bore of said base member, said pin connects said base member and the scraping member to said first mounting member and the support member, and said first rib interlocks with said first groove of said pin such that said first rib resists removal of said pin from said first bore of said base member while allowing removal of said pin from said first bore upon application of sufficient force to said pin.

15. The mounting arrangement of claim 14 including a second mounting member having a second aperture, said second aperture aligned with said first aperture and adapted to receive said pin.

16. The mounting arrangement of claim 14 wherein said first bore of said base member includes a second rib and said pin includes a second groove adapted to receive and interlock with said second rib.

17. The mounting arrangement of claim 16 wherein said first and second ribs are each generally annular, and said first and second grooves of said pin are each generally annular.

18. The mounting arrangement of claim 16 wherein said first rib includes a generally cylindrical first side wall located between a first generally conical side wall and a second generally conical side wall, said second rib includes a generally cylindrical second side wall located between a third generally conical side wall and a fourth generally conical side wall, said first groove of said pin includes a first generally cylindrical surface located between a first generally conical surface and a second generally conical surface, and said second groove of said pin includes a second generally cylindrical surface located between a third generally conical surface and a fourth generally conical surface.

19. The mounting arrangement of claim 18 wherein said first bore of said base member includes a third generally cylindrical wall located between said first rib and said second rib, and said pin includes a third generally cylindrical surface located between said first groove and said second groove.

20. The mounting arrangement of claim 15 wherein said pin includes a first surface located between said first end of said pin and said first groove of said pin, and a second surface located between said first groove of said pin and said second end of said pin, said first surface adapted to be located within said first aperture of said first mounting member and said second surface adapted to be located within said second aperture of said second mounting member.

21. The mounting arrangement of claim 20 wherein said pin includes a first collar that extends around said first surface of said pin, and a second collar that extends around said second surface of said pin.

22. The mounting arrangement of claim 14 wherein said base member includes a slot adapted to receive said first mounting member.

23. The mounting arrangement of claim 22 wherein said base member includes a first leg and a second leg, said slot being located between said first leg and said second leg, said first leg including said first bore and said second leg including a second bore, said second bore including an inwardly extending second rib.

24. The mounting arrangement of claim 23 wherein said pin includes a second groove adapted to receive and interlock with said second rib of said second leg, said pin including a generally cylindrical portion located between said first and second grooves of said pin, said cylindrical portion adapted to be located in said first aperture of said first mounting member.

25. A self-locking mounting pin for removably connecting a conveyor belt cleaner scraper blade to a mounting member of a support member, said mounting pin including:
a shank having a first end, a second end, a first cylindrical portion at said first end, a second cylindrical portion at said second end, and an annular first groove located between said first and second cylindrical portions.

26. The self-locking mounting pin of claim 25 wherein said shank includes an annular second groove located between said first and second cylindrical portions, and a third cylindrical portion located between said first and second grooves.

27. The self-locking mounting pin of claim 25 wherein said first annular groove includes a generally cylindrical surface, a first generally conical surface and a second generally conical surface, said cylindrical surface being located between said first and second conical surfaces.

* * * * *